United States Patent
Tada et al.

(10) Patent No.: US 10,992,632 B2
(45) Date of Patent: Apr. 27, 2021

(54) CONTENT EVALUATION

(71) Applicant: INTERNATIONAL BUSINESS MACHINES CORPORATION, Armonk, NY (US)

(72) Inventors: Masami Tada, Kanagawa (JP); Sanehiro Furuichi, Tokyo (JP); Akira Ohkado, Yokohama (JP); Satoshi Kawase, Funabashi (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 16/238,825

(22) Filed: Jan. 3, 2019

(65) Prior Publication Data
US 2020/0220832 A1    Jul. 9, 2020

(51) Int. Cl.
*G06F 15/16* (2006.01)
*H04L 12/58* (2006.01)

(52) U.S. Cl.
CPC ............ *H04L 51/32* (2013.01); *H04L 51/04* (2013.01); *H04L 51/16* (2013.01)

(58) Field of Classification Search
None
See application file for complete search history.

(56) References Cited

U.S. PATENT DOCUMENTS

| | | | | |
|---|---|---|---|---|
| 8,738,721 B1 * | 5/2014 | Smirnov | ............ | G06Q 10/107 709/206 |
| 9,495,695 B2 * | 11/2016 | Maddali | ............ | G06F 16/24578 |
| 2004/0205065 A1 * | 10/2004 | Petras | ............ | B01D 3/146 |
| 2013/0191298 A1 * | 7/2013 | Myslinski | ............ | G06Q 10/10 705/317 |
| 2016/0048934 A1 * | 2/2016 | Gross | ............ | G06Q 30/0276 705/313 |
| 2016/0180414 A1 * | 6/2016 | Willard | ............ | G06Q 30/0282 705/347 |
| 2016/0234266 A1 | 8/2016 | Harpur et al. | | |
| 2017/0124468 A1 | 5/2017 | Bolshinsky et al. | | |
| 2017/0177578 A1 | 6/2017 | Tas et al. | | |
| 2019/0164082 A1 * | 5/2019 | Wu | ............ | G06Q 30/0277 |

FOREIGN PATENT DOCUMENTS

| | | | |
|---|---|---|---|
| JP | H0554037 A | 3/1993 | |
| JP | H0736897 A | 2/1995 | |

OTHER PUBLICATIONS

Blei, D.M. et al., "Latent dirichlet allocation," In Journal of Machine Learning Research. Jan. 2003, vol. 3, pp. 993-1022.
Mell, P. et al., The NIST Definition of Cloud Computing, National Institute of Standards and Technology, U.S. Dept. of Commerce, Special Publication 800-145, Sep. 2011, 7 pg.

* cited by examiner

*Primary Examiner* — Phuoc H Nguyen
(74) *Attorney, Agent, or Firm* — Cuenot, Forsythe & Kim, LLC

(57) ABSTRACT

Evaluating messaging content on a computer-based communications network includes classifying, using computer hardware, a response to a message previously rated by a user. The message, the response to the message, and the rating by the user can each be provided on the computer-based communications network. Evaluating messaging content also includes automatically changing, with the computer hardware, the rating of the message when the classifying of the response results in a classification that satisfies a predefined rating change condition.

15 Claims, 20 Drawing Sheets

CONTENT EVALUATION

BACKGROUND OF THE INVENTION

The present disclosure relates to computer networking, and more particularly, to computer-based social networking services.

Computer-based social networking services enable users widely dispersed geographically from one another to interact and exchange data using a range of devices, including laptop computers, tablets, smartphones and a range of other electronic communication devices. Some social networks focus primarily on providing a platform for friends and acquaintances to socialize with one another, while others focus primarily on enabling non-personal, career-related communications among different users. Other social networks can be characterized as social navigation networks aimed at providing users specific types of information or resources.

SUMMARY

A method includes classifying, using computer hardware, a response to a message previously rated by a user. The message, the response to the message, and the rating by the user can be provided on a communications network. The method can include automatically changing, with the computer hardware, the rating of the message when the classifying results in a classification that satisfies a predefined rating change condition.

A system includes at least one processor programmed to initiate executable operations. The executable operations include classifying a response to a message previously rated by a user. The message, the response to the message, and the rating by the user can be provided on a communications network. The method can include automatically changing the rating of the message when the classifying results in a classification that satisfies a predefined rating change condition.

A computer program product includes a computer-readable storage medium having program code stored thereon. The program code is executable by computer hardware to initiate operations. The operations include classifying a response to a message previously rated by a user. The message, the response to the message, and the rating by the user can be provided on a communications network. The method can include automatically changing the rating of the message when the classifying results in a classification that satisfies a predefined rating change condition.

DETAILED DESCRIPTION

Figure 1:
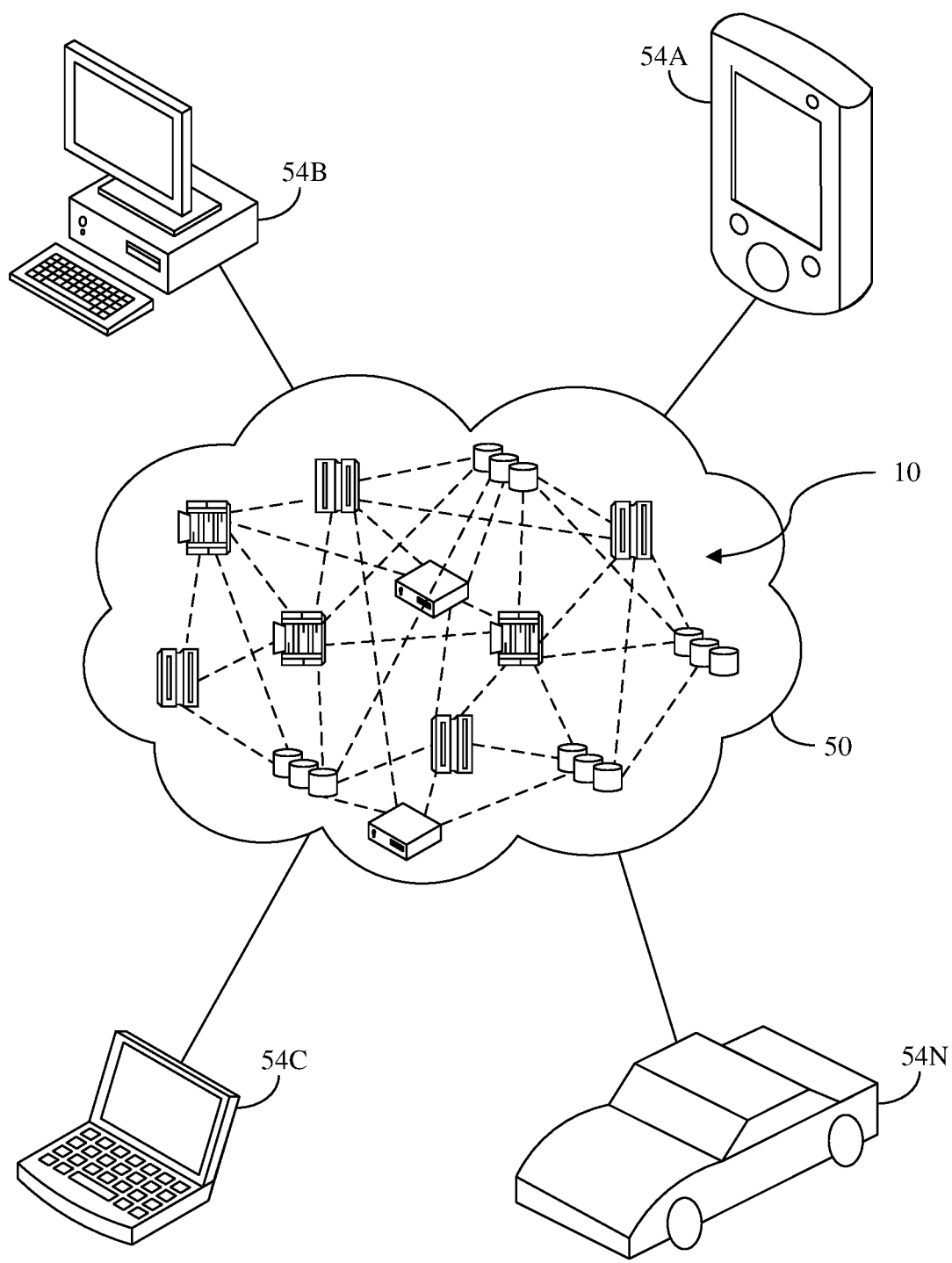
FIG. 1 depicts a cloud computing environment according to an embodiment of the present invention.

The present disclosure relates to a computer-based networks, particularly computer-based social networking services A social networking service allows geographically dispersed users to communication with one another and exchange various types of data. Many such social networking services enable users to engage in on-line discussions, share ideas, post comments, and provide various types of information.

The benefits provided by such networks can be considerable. Such networks expose users to a more diverse range of ideas and opinions than the users would otherwise be exposed. These networks can allow users to engage in more numerous and more extensive dialogues than the users would otherwise be able to engage. As frequently remarked, such networks can bring the world closer together.

There is a downside risk to such network exchanges, however. At times, an originating message initiates one or more follow-on messages that take a message-drive conversation in an entirely different direction or give an earlier message an entirely different meaning or interpretation. In some instances, it is the author of an originating message that adds or modifies the original message's content and gives the original message an entirely different meaning or interpretation.

A common feature of much of the software that implements social networking services is a rating option, such as the familiar thumbs-up "Like" button. Using the Like button or other rating option, a user can express agreement with, or endorsement of, a view expressed in a message. The problem arises when, subsequent to the user expressing agreement or endorsing a message, a follow-on message or comment changes the meaning or interpretation of the message the user endorsed. Thus, the user appears to agree with or endorse a message that the user does not agree with or, in fact, endorse. The problem is two-fold. First, the message appears to have broader support than the message has. Second, the user can be embarrassed by seeming to endorse or agree with a view the user does not agree with, and indeed, may find repugnant. The dilemma is how to "un-ring the bell" the user's previous endorsement rang.

The methods, systems, and computer program products disclosed herein provide content evaluation of network-published messages and can automatically cancel or reverse user's earlier rating (e.g., Like) when certain predefined conditions, specified by the user, are satisfied.

In a specific embodiment, a system provides the user an ability to provide a conditional rating and set conditions for cancelling the rating if certain conditions occur. The system can monitor follow-on messages, including comments and content modifications of the original message that the user has conditionally rated. Using techniques described herein, the system can extract content comprising key words and/or topics that the system uses to classify responses engendered by a message. If the classification places a response (comment or change in content) in one or more categories specified by the user, the conditional rating is cancelled or reversed.

The user can establish the conditions for cancelling or reversing a conditional rating, by specifying key words or topics corresponding to cancellation or rating reversal categories. Thus, when the system's analysis of extracted content places a response in a category that matches such a category, the system automatically changes the earlier rating, either by cancelling the rating or reversing the rating.

In one embodiment, before a third-party comment is added to a message stream, a message content evaluation determines the number of ratings (e.g., Likes) that will be cancelled if the comment is added. One response is to block adding the comment to the message stream. In another embodiment, a message content evaluation response can include conditioning a user's rating of the message on whether or not a party the user has designated a trusted party provides a similar rating. If so, a user's conditional rating is automatically changed to an unconditional rating.

The methods, systems, and computer program products disclosed herein improve the performance of a communications network such as a computer-based social network. Such networks are intended to enable the exchange of information and foster free and open exchanges among users. The objective is frustrated if users withdraw network participation out of concern that rating message content as part of a dialogue will be misconstrued or mischaracterized. The methods, systems, and computer program products disclosed herein mitigate the concern by providing an on-going, autonomous evaluation of content and an automatic response when messaging content takes a turn that deviates from specifications set by a network user.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
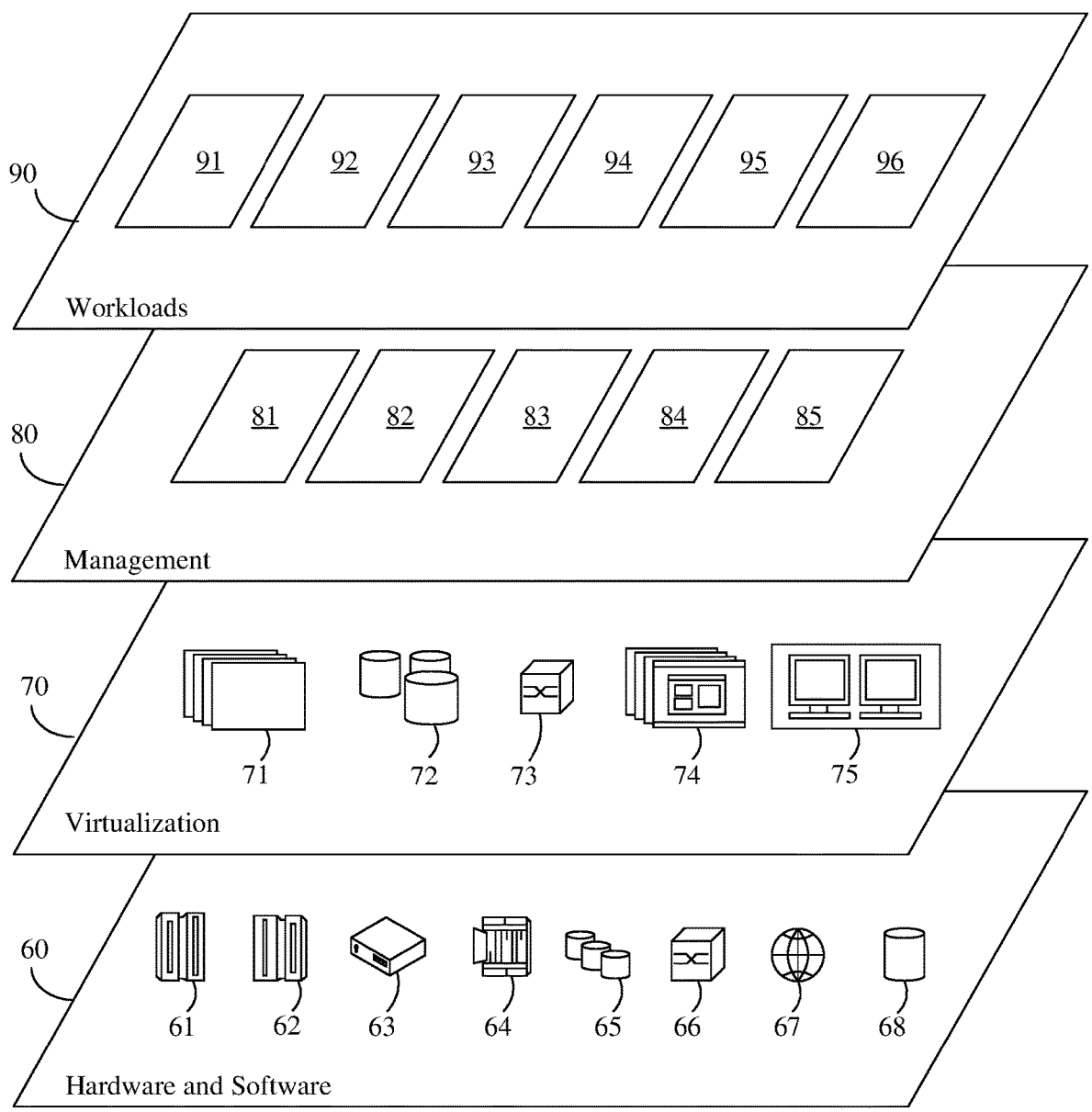
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and messaging content evaluation 96.

In one or more embodiments, a system for performing content evaluation 96 includes sections (e.g., computer-executable code) for analyzing comments and other responses to messages, the messages and responses both submitted on a social network to which the user is communicatively linked. Messages and comments can be analyzed using natural language processing and/or other techniques to determine the topics and analyze the specific language used to express the topics. A system analyzer in one embodiment can classify sentences by calculating word appearance frequencies with respect to nouns and verbs and classifying a sentence based on a closeness between the frequencies in the unclassified sentence and frequencies of classified sentences. The analyzer, additionally or alternatively, can execute a morpheme analysis using a table of vectors indicating the features of independent words of analyzed morphemes, preparing a vector corresponding to each independent word based upon the table, and performing clustering analysis to group a sentence vector under analysis with a classified group of prepared sentence vectors. Optionally, a tone analyzer also can be used to also analyze the emotion or sentiment expressed in a message or comment.

The user can specify that certain language and/or topics are objectionable or otherwise conflictive with stored system parameters specified by the user. If the user has previously provided a rating to a message that the system later classifies as incompatible owing to a subsequent modification of the content or a comment that gives the message a different meaning or interpretation, then the system automatically cancels or changes the user's previous rating.

The system optionally warns a commentator when addition of a comment to a message will cancel one or more ratings (e.g., cancelling a number Likes). In one embodiment, the system can compute the number of ratings that would be cancelled and can block adding the comment if the number exceeds a predetermined threshold.

A content evaluation system can be implemented in software that cooperatively functions with software that implements a social networking service. The software can comprise computer-executable code that resides on a device such as a user's computer or smartphone, for example, as an optional function of a social network service application. Alternatively, or additionally, the computer executable code can reside on a computer (e.g., network server) that executes the social networking software, for example, as a system-embedded feature of the social network service server. In still another embodiment, for example, the content evaluation system can be implemented as a third-party plug-in module on an external server.

Figure 3:
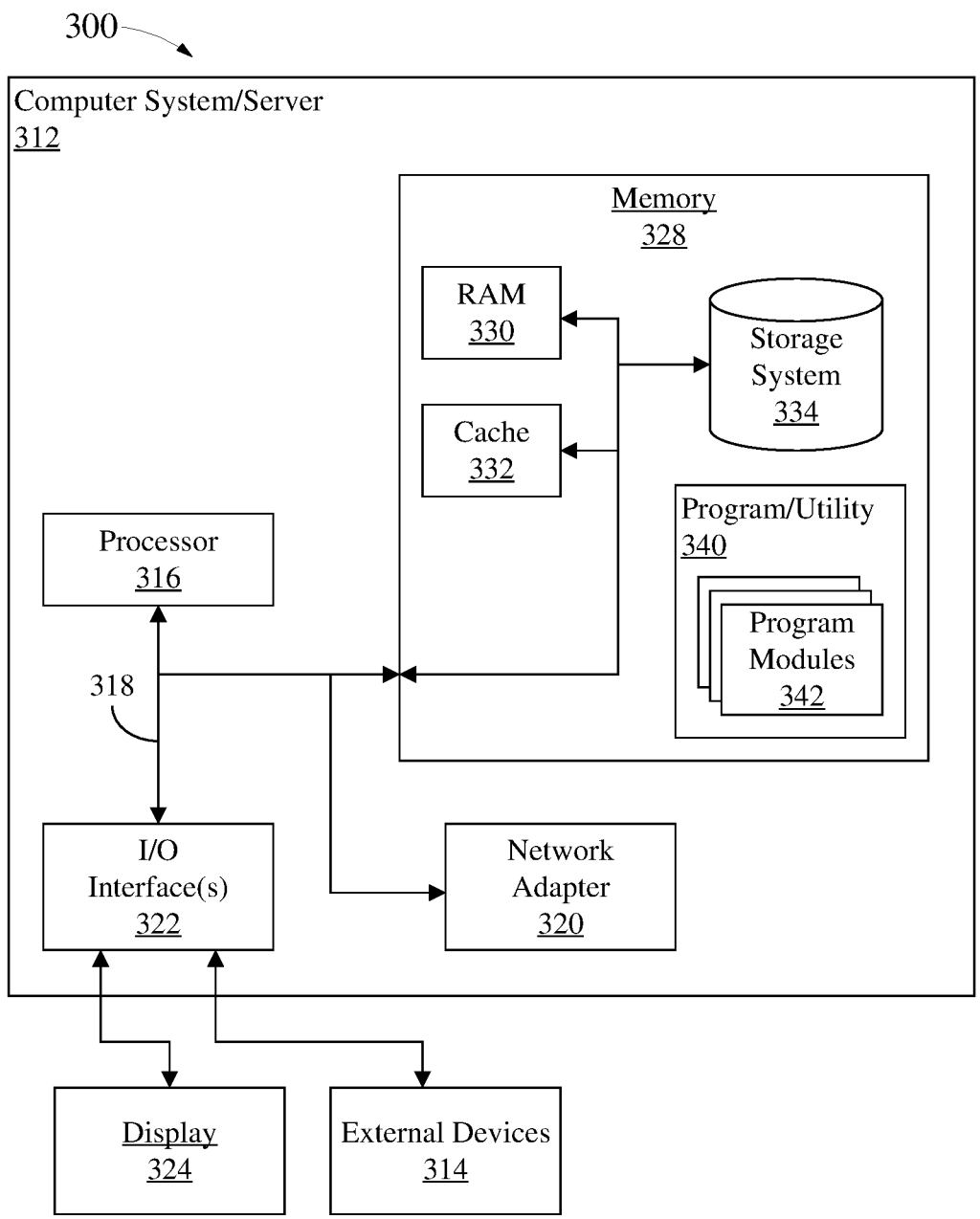
FIG. 3 depicts a cloud computing node according to an embodiment of the present invention.

Referring now to FIG. 3, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes a computer 312, which is operational with numerous other general-purpose or special-purpose computing system environments or configurations. Examples of well-known computing systems, environments, and/or configurations that may be suitable for use with computer 312 include, but are not limited to, personal computers, servers, thin clients, thick clients, hand-held or laptop devices, multiprocessor systems, microprocessor-based systems, set top boxes, programmable consumer electronics, network PCs, minicomputers, mainframe computers, and distributed cloud computing environments that include any of the above systems or devices, and the like.

Computer 312 may be described in the general context of computer system-executable instructions, such as program modules, being executed by a computer or computing system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer 312 in cloud computing node 300 is shown in the form of a general-purpose computing device. The components of computer 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and a PCI express (PCIe) bus.

Computer 312 typically includes a variety of computer-readable media. Such media may be any available media that is accessible by computer 312, and includes both volatile and non-volatile media, removable and non-removable media.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules may include system for performing content evaluation 96 or portions thereof. Program/utility 340 is executable by processor 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via Input/Output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples include, but are not limited to, the following: microcode, device drivers, redundant processing units, external disk drive arrays, RAID systems, tape drives, and data archival storage systems.

While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
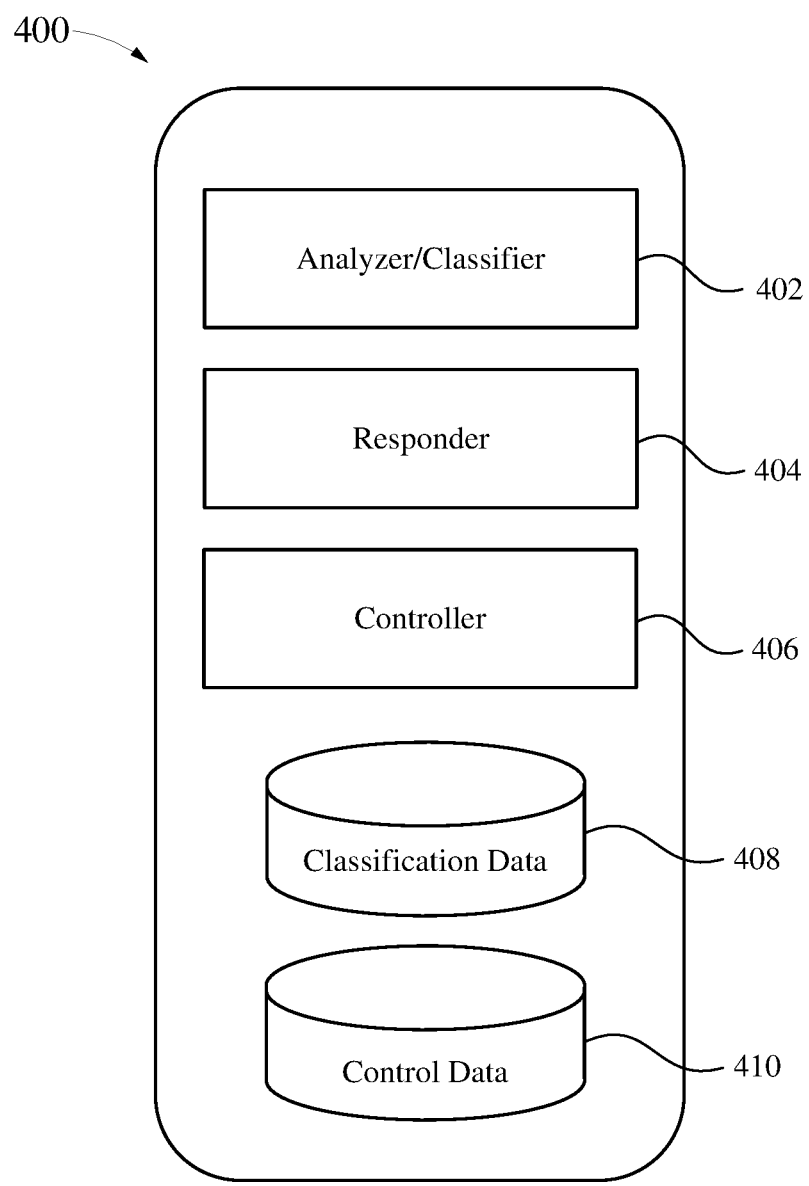
FIG. 4 depicts an architecture of a content evaluation system according to an embodiment of the present invention.

FIG. 4 depicts an architecture of a content evaluation system 400 according to one embodiment. System 400 illustratively includes analyzer/classifier 402, responder 404, and controller 406. Additionally, system 400 illustratively includes a database comprising classification data 408 and a database comprising control data 410.

Analyzer/classifier 402 analyzes messages and comments that are exchanged over a computer-based network, the exchanges hosted by a social networking service. Based on the analysis, messages and comments are classified by analyzer/classifier 402 according to classification parameters established by a system user. The parameters can comprise key words and topics. For example, the user can specify that certain topics, statements, or words are objectionable. The topics, statements or words may be insensitive, discriminatory, or hurtful to one or more individuals. The accuracy or authenticity of certain statements may be questionable. Such topics, statements, and words can be categorized into certain categories the user specifies as cancellation or reversal categories. The parameters on which the categories are based comprise the stored classification data 408. Responses to user-rated messages that the analyzer/classifier classifies as belonging to one or more such categories initiate responses, described below, by responder 404.

Analyzer/classifier 402 can analyze messages and comments conveyed over the computer-based network using, for example, natural language processing (NLP). Generally, NLP facilitates computer-human (natural) language interaction. More specifically, NLP enables computers to derive computer-understandable meaning from natural language (e.g., text) input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, sentiment analysis, and quantification information, such as cardinality, iteration, and dependency.

In one embodiment, analyzer/classifier 402 can classify sentences based on word-occurrence frequencies. The frequencies of appearance of nouns and verbs in an unclassified sentence are calculated and, based on a comparison of the frequencies with occurrence frequencies of nouns and verbs occurring in stored sentences classified as belonging to specific categories, the unclassified sentence is classified.

In another embodiment, analyzer/classifier 402 can perform clustering analysis of feature vectors corresponding to independent words. The feature vectors of independent word are determined by morpheme analysis. Sentence vectors are generated from independent words. The sentences are classified by the clustering analysis that groups sufficiently similar sentence vectors into distinct groups.

In yet another embodiment, analyzer/classifier 402 can analyze messages and comments for topic indicia using latent Dirichlet allocation (LDA). LDA is a generative probabilistic, three-level hierarchical Bayesian model for analyzing discrete data in text corpora. Each item of a text corpus is modeled, according to LDA, as a finite mixture over an underlying set of topics, and each topic is modeled as an infinite mixture over an underlying set of topic probabilities. The corpora of messages and comments conveyed over a computer network can be treated as any text corpora and analyzed using LDA to identify topics and thereby classify specific messages and comments.

In still another embodiment, messages and comments can be analyzed for tone. Tone analysis can reveal emotion or sentiment, such as anger, associated with a message or comment. Statements that denote a tone of anger, for example, can meet user-specified conditions for being designated as objectionable or incompatible by analyzer/classifier 402.

System 400 monitors responses to messages previously rated by the user. Responses can be comments to the earlier message, changes in the content of the message, or any other follow-on message related to the message rated by the user. If a response is to message the user conditionally rated, analyzer/classifier 402 extracts content from the response using one or more, or any combination of, the techniques described above. Based on the extracted content, analyzer/classifier 402 categorizes the response. If the category matches one that the user has specified as a cancellation category, the system invokes action by responder 404. Responder 404 responds to the categorization by cancelling the user's previous rating of the message.

In one embodiment, if system 400 is operating in conjunction with a social network rating service that provides a contra rating, responder 404 can change the rating. For example, if the rating was a Like, responder 404 can reverse the rating to Dislike.

In another embodiment, system 400 can include a cancellation counter. Analyzer/classifier 402 extracts content and classifies the extracted content as described above for each response to a message conditionally rated by the user. The counter is incremented each time that the extracted is assigned to a category that matches a cancellation category. The user can set a cancellation threshold value such that that responder 404 only cancels a rating if the number of matches exceeds the threshold value.

In yet another embodiment, the counter can be decremented for each additional response that does not produce a match. Thus, after cancelling a rating, monitoring subsequent responses can cause responder 404 to restore a cancelled rating if the counter is decremented to a value less than the cancellation threshold.

In still another embodiment, the user can weight or assign values to multiple cancellation categories. For example, a low value (e.g., 1) can be assigned to a category in which questionable, though not clearly objectionable, topics or statement are placed. A high value (e.g., 10) can be assigned to a category for particularly egregious or offensive topics or statement. A cumulative score can be computed with each response. If the cumulative score exceeds a cancellation threshold, then a previous rating is cancelled (or, in some cases, reversed). In some instances a single response that is categorized with a high score may result in cancellation, whereas in other instances only the cumulative effect of multiple questionable responses results in the responder 404 cancelling (or reversing) a rating.

Certain operative features of content valuation system 400, according to different embodiments, are illustrated in following series of figures in the context of several messaging statements and comments. In the figures, different users are depicted as engaged in different on-line conversations or message exchanges. One user (User A) rates different messages, while another user (User B) is designated by the former as a trusted party (classified as "friends"). Still another user (Submitter) initiates a conversation by submitting a message, which is commented on by yet another user (Commenter).

Figure 5:
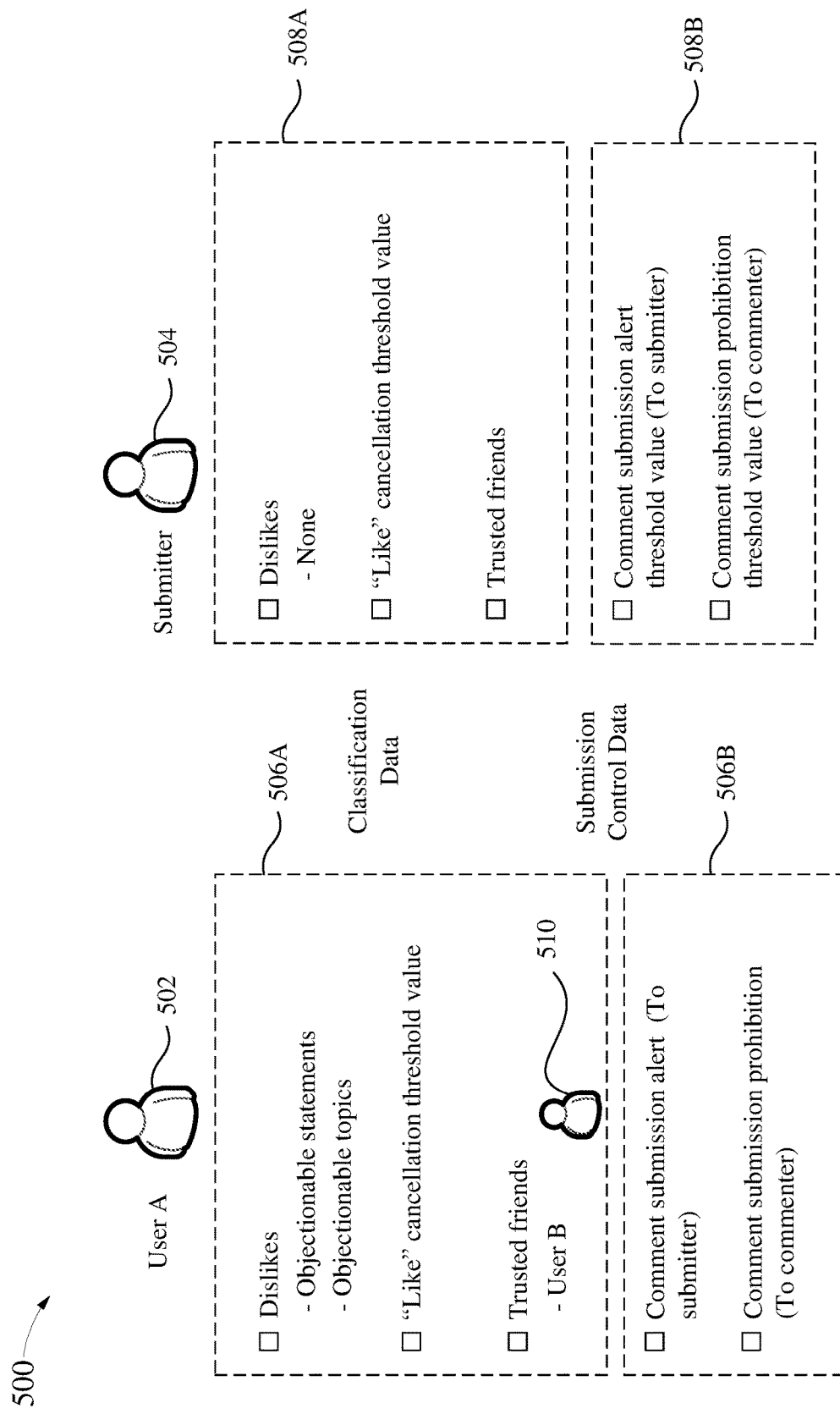
FIG. 5 depicts certain operative features of a messaging content evaluation system according to an embodiment of the present invention.

FIG. 5 depicts system settings 500 for User A 502 and Submitter 504, including classification data and submission control data for both. Both users engage in conversations on a social network that enables users to rate statements with a "Like" designation. Classification data 506A for user A specifies parameters that categorize certain topics and statements as "objectionable." Classification data 506A also specifies a cancellation threshold value that, if exceeded, directs a responder to cancel or reverse a previous ranking of a message by User A. Classification data 506A also specifies User B as a trusted party (User A's trusted friend) 510. Illustratively, no comparable values are specified for classification data 508A of Submitter 504. Submission control data 506B and 508B can specify threshold values (none explicitly given in the figure) for automatically sending an alert notifying a commentator that adding a particular comment to a message will result is a specified number of Like cancellations. Relatedly, submission control data 506B and 508B can specify parameters for blocking the addition of a comment if certain conditions are met.

Figure 6:
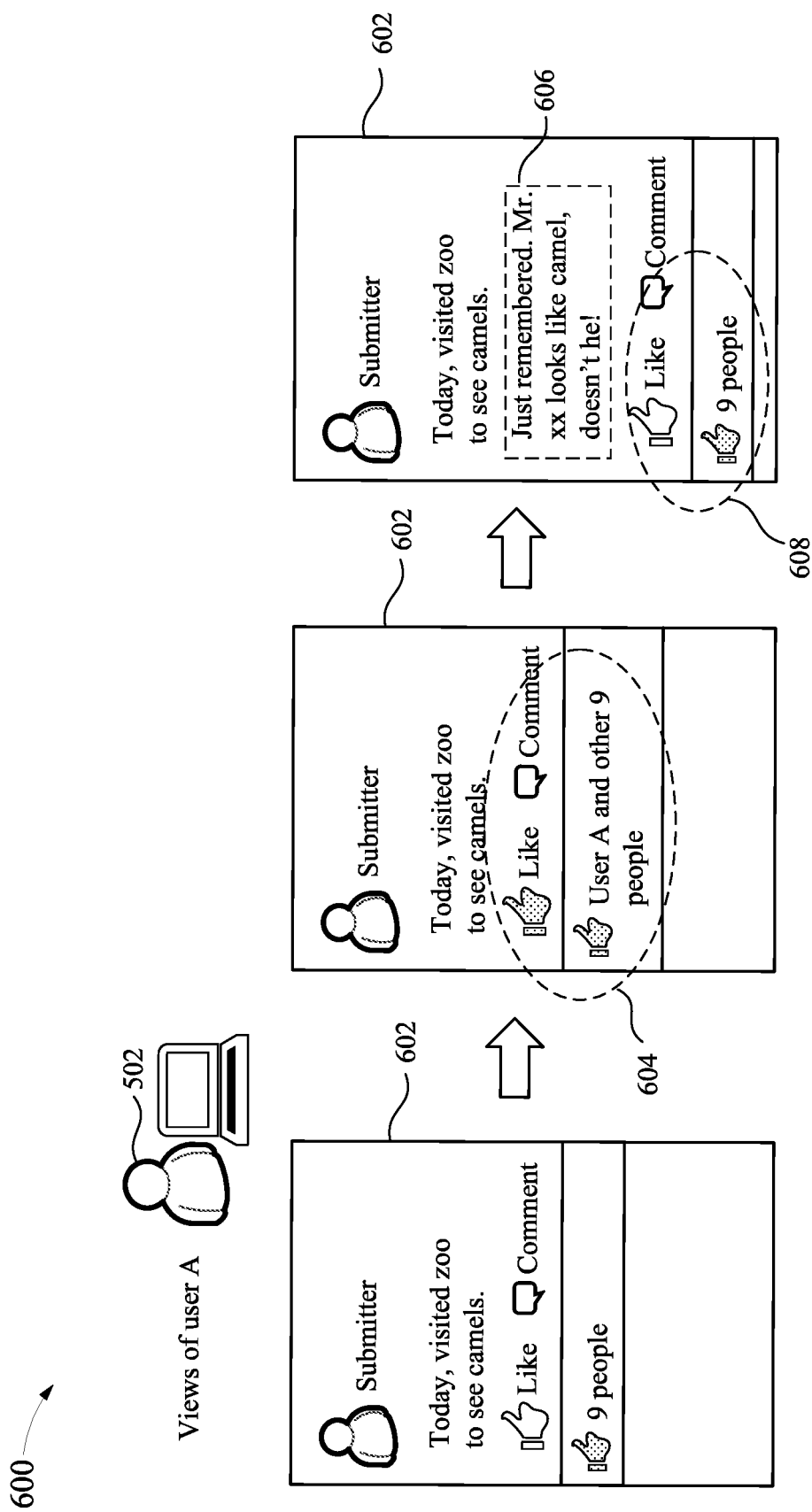
FIG. 6 depicts certain operative features of a messaging content evaluation system according to an embodiment of the present invention.

FIG. 6 depicts a scenario 600 in which a submitter conveys a message 602 over a computer network. The message describes a visit to a zoo by the submitter. User A 502 rates the message 602 using the "click" of a button that adds a Like 604 to the message. As illustrated nine other users have rated the message 602 similarly. Subsequently, though, Submitter takes the message in another direction by adding a derogatory comment 606 to the message 602. The comment is recognized by User A's system's analyzer/classifier as being within the "Dislike" category of User A's classification data 506A. As a result, User A's system's responder cancels the previously provided rating 604, by removing the Like, leaving only nine users having expressed a Like rating 608.

Figure 7:
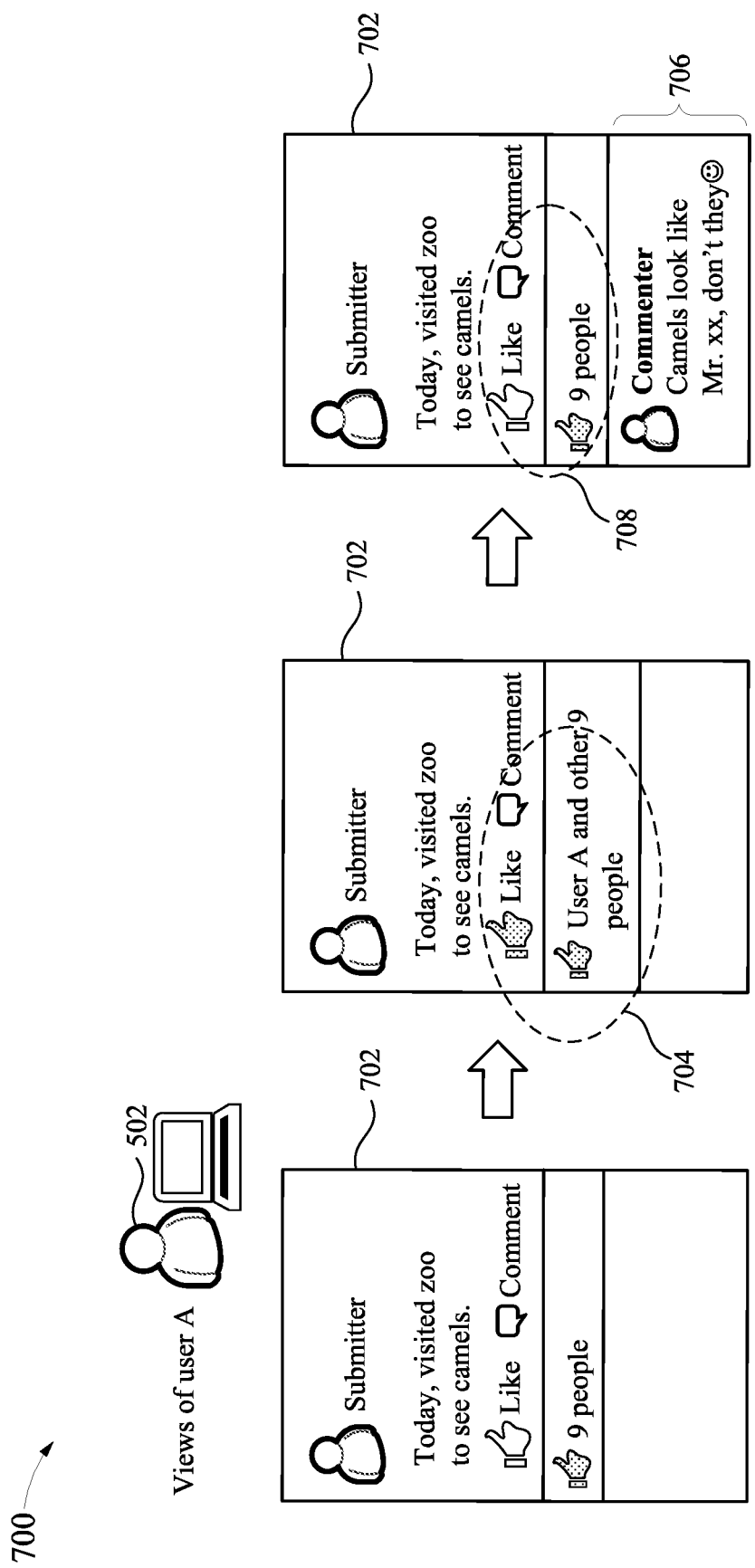
FIG. 7 depicts certain operative features of a messaging content evaluation system according to an embodiment of the present invention.

FIG. 7 depicts a similar scenario 700 in which a submitter conveys a message 702 over a computer network. The message describes a visit to a zoo by the submitter. User A 502 rates the message 702 using the "click" of button that adds a Like 704 to the message. As illustrated nine other users have rated the message 702 similarly. A comment 706 is subsequently added to the message 702. The comment is recognized by User A's system's analyzer/classifier as being within the "Dislike" category of User A's classification data 506A. As a result, User A's system's responder cancels the previously provided rating 704, by removing the Like, leaving only nine users having expressed a Like rating 708.

Optionally, content evaluation system 400 enables a user to reserve or make conditional a rating depending on the action of a trusted party. If the trusted party takes the designated action (e.g., designating a similar rating), then the rating is automatically made unconditional. Otherwise, the system can, after a designated time, cancel the rating. The following scenario illustrates the operation.

Figure 8:
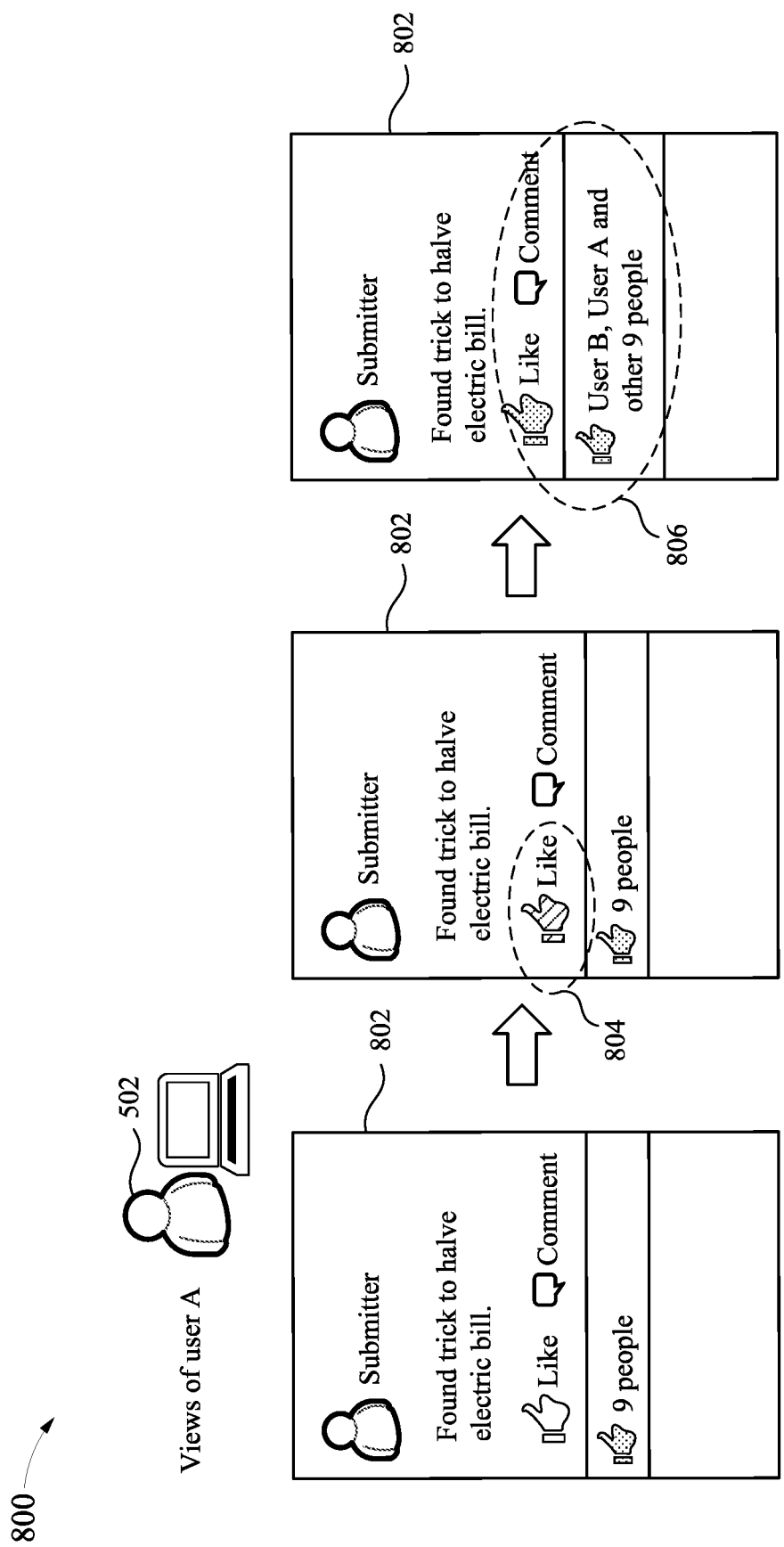
FIG. 8 depicts certain operative features of a messaging content evaluation system according to an embodiment of the present invention.

FIG. 8 depicts a scenario 800 in which a submitter conveys a message 802 over the computer network claiming to have found a way to reduce expenses. User A 502, whose classification data 506A designates another user as a trusted party (User B), provides a conditional Like 804 conditioned on User B similarly rating the message 802. When User B does subsequently express a Like, User A's conditional Like becomes an unconditional Like 806.

Content evaluation system 400, in another embodiment, provides a warning that indicates the number of ratings that will be cancelled or reversed, if a message submitter changes the content in way that other users find objectionable. The following scenario illustrates the operation.

Figure 9:
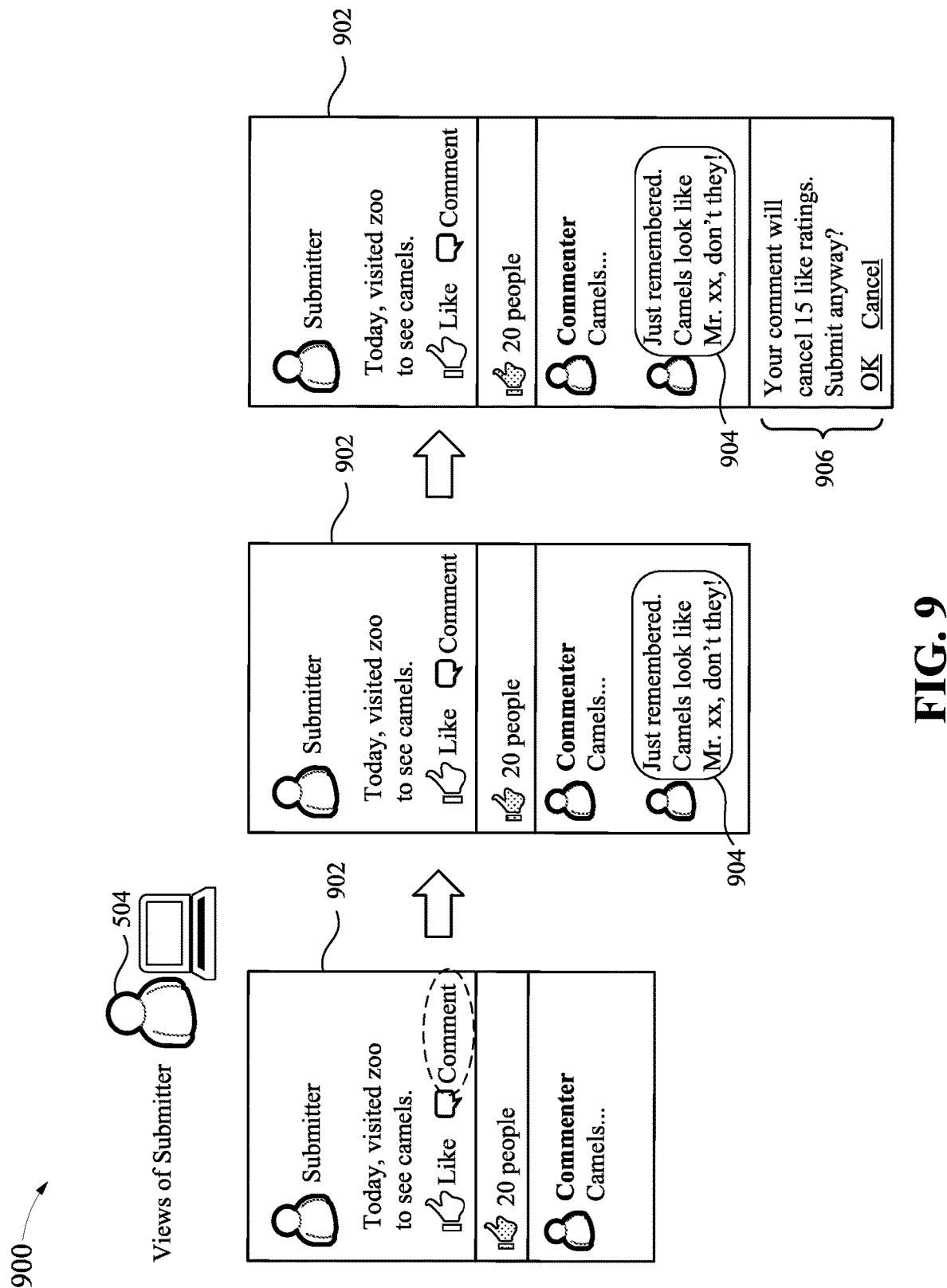
FIG. 9 depicts certain operative features of a messaging content evaluation system according to an embodiment of the present invention.

FIG. 9 depicts a scenario 900 in which Submitter 504 conveys a message 902 about a trip to the zoo. The message initially elicits 20 Likes from other users. Subsequently, Submitter 504 modifies the original message by adding a derogatory comment 904. The comment 904 is recognized as being within the "Dislike" categories of classification data for 15 of the 20 users who rated the message with Likes. As a result, the system alerts Submitter 504 with a warning 906 that adding the comment 904 will result in 15 of the 20 Likes being cancelled or reversed. In one embodiment, a threshold can be established such that the warning is sent only when the number of cancellation or reversals exceeds the specified threshold. The threshold value can be part of submission control data 508B of the submitter.

Relatedly, an embodiment of the content evaluation system affirmatively blocks the addition of a comment if a more than a threshold number of reversal or cancellations. This operation is illustrated in following figure.

Figure 10:
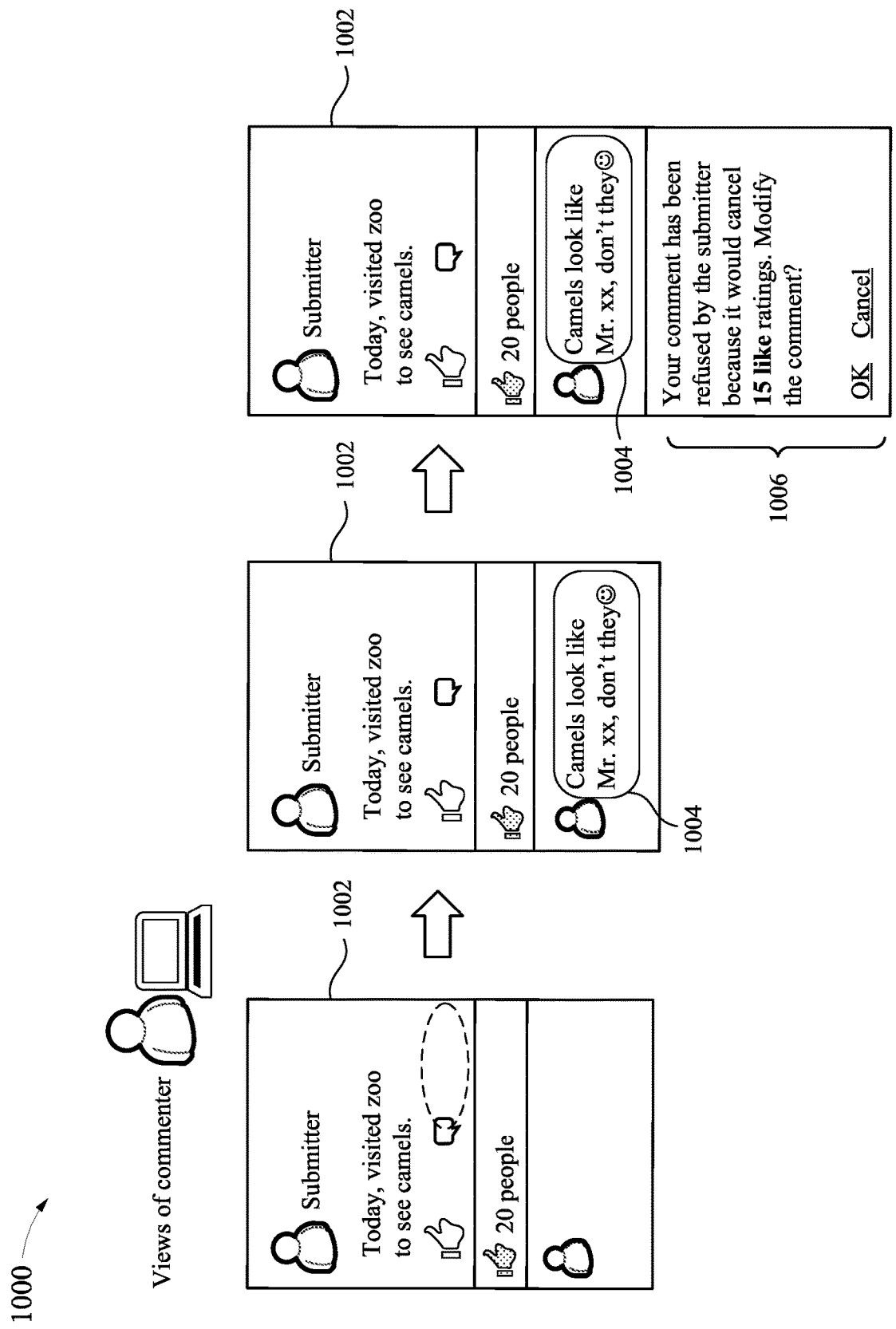
FIG. 10 depicts certain operative features of a messaging content evaluation system according to an embodiment of the present invention.

FIG. 10 depicts a scenario 1000 in which Submitter 504 conveys a message 1002 about a trip to the zoo. The message initially elicits 20 Likes from other users. Subsequently, Commenter 1001 conveys a derogatory comment 1004. The comment is recognized as being within the "Dislike" categories of classification data for 15 of the 20 users who rated the message with Likes. As a result, the system blocks the comment from being added, and sends an explanatory message 1006 to Commenter 1001. In another embodiment, a threshold can be established such that the blocking only occurs when the number of cancellation or reversals exceeds the specified threshold. The threshold value can be part of submission control data 508B.

Content evaluation system 400 in another embodiment can change a previous rating of a message by user in response to another user who has been designated as a trusted party by the former user giving the message a different rating. The following figure illustrates the operation.

Figure 11:
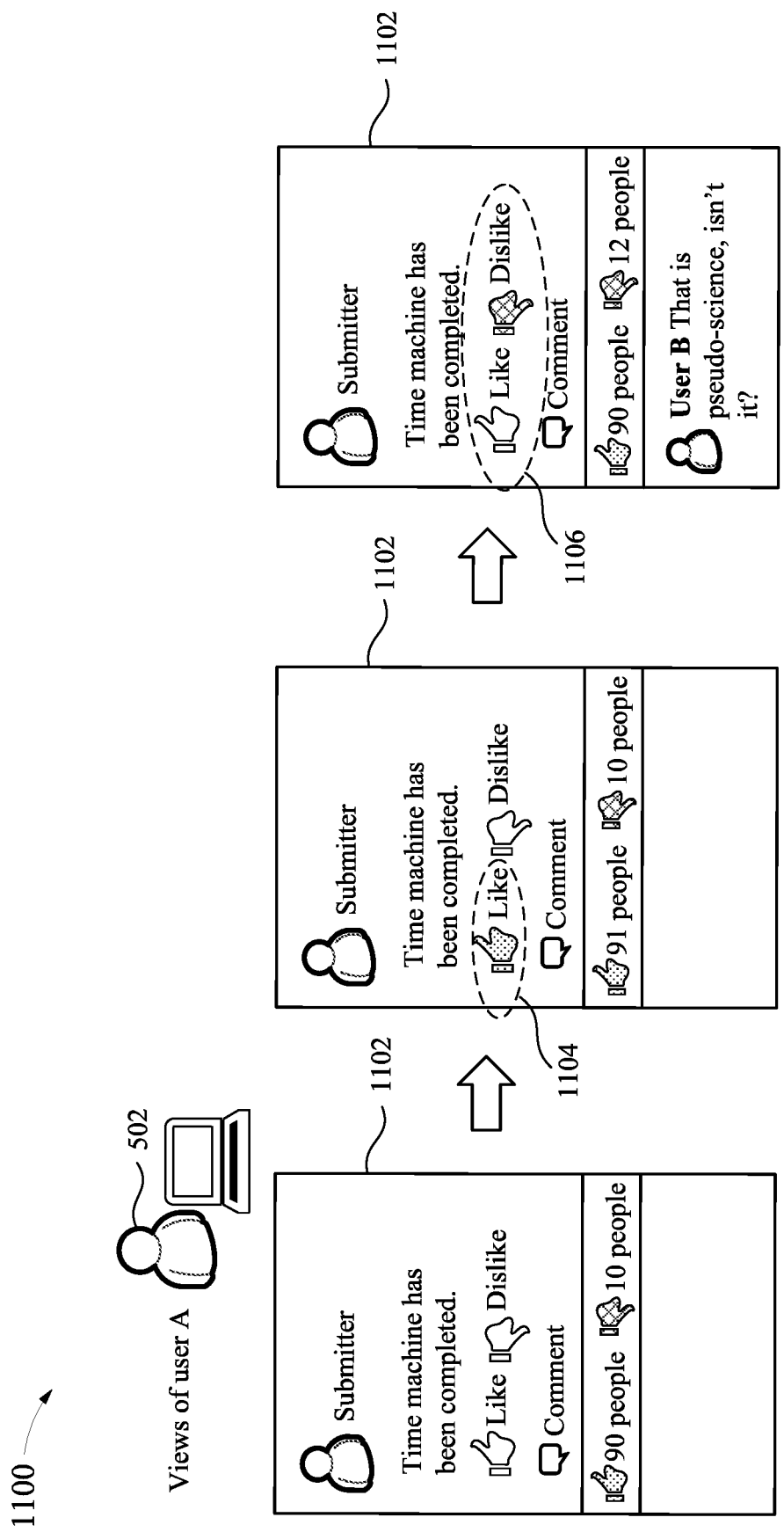
FIG. 11 depicts certain operative features of a messaging content evaluation system according to an embodiment of the present invention.

FIG. 11 depicts a scenario 1100 in which a submitter conveys over the computer network a message 1102 that User A 502 initially rates with a Like rating 1104. Subsequent to User A rating the message, User B, who in User A's classification data 506A is designated a trusted party, rates the same message differently. As a result, the system reverses User A's rating from Like 1104 to Dislike 1106.

User A can also specify as part of the classification data 506B a threshold value that directs the responder 404 to change a rating (either cancelling or reversing a previous rating) only when the number of statements or comments classified by the analyzer/classifier 402 exceeds a user-specified threshold.

Figure 12:
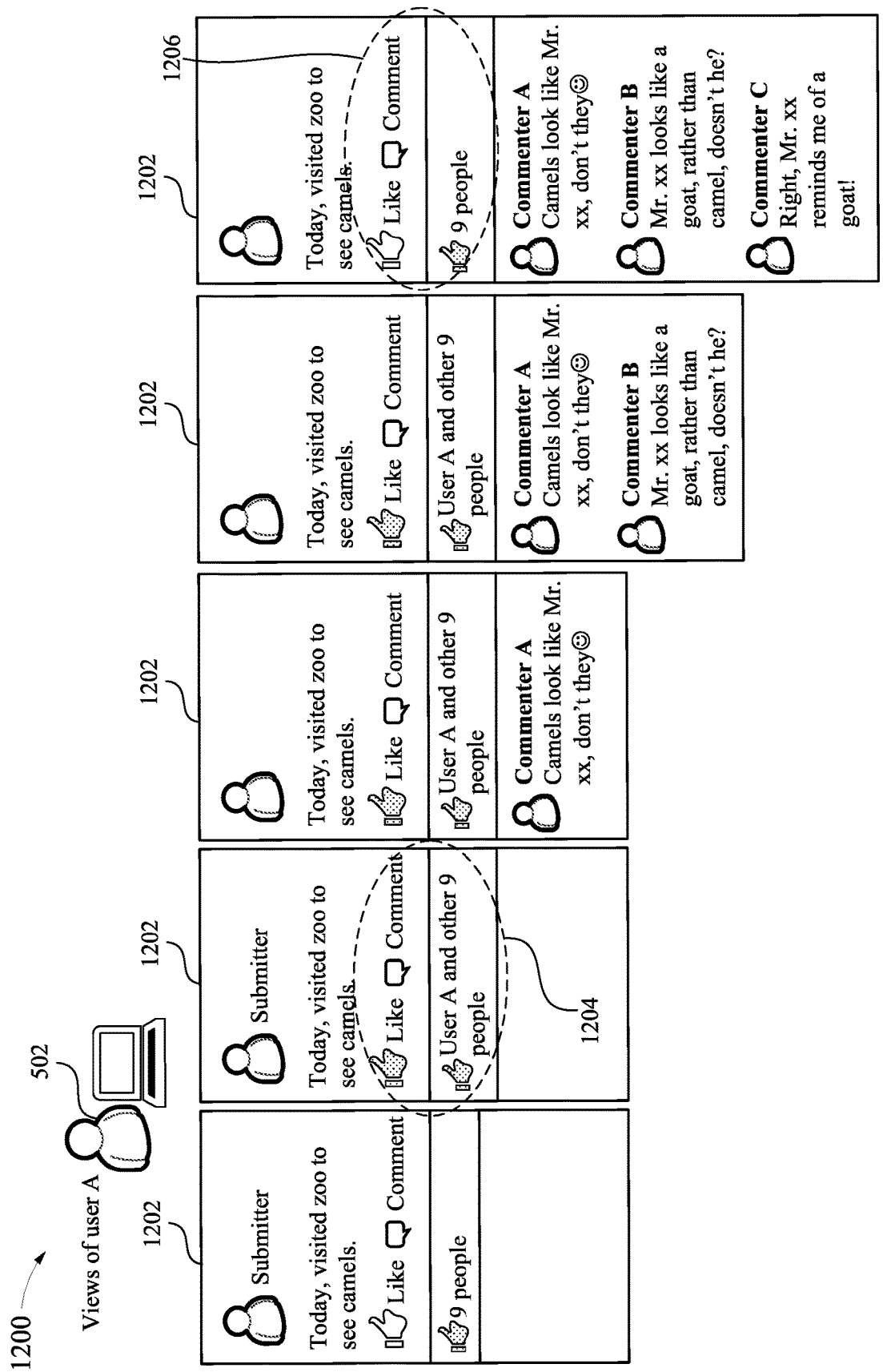
FIG. 12 depicts certain operative features of a messaging content evaluation system according to an embodiment of the present invention.

FIG. 12 depicts a scenario 1200 in which User A 502 rates message 1202 with Like rating 1204. Only after three comments (threshold) have been classified as objectionable based on the determination of analyzer/classifier 402 does the responder 404 direct the controller 406 to cancel the rating by removing the Like designation, thereby changing the designation to a neutral rating 1206.

Figure 13A:
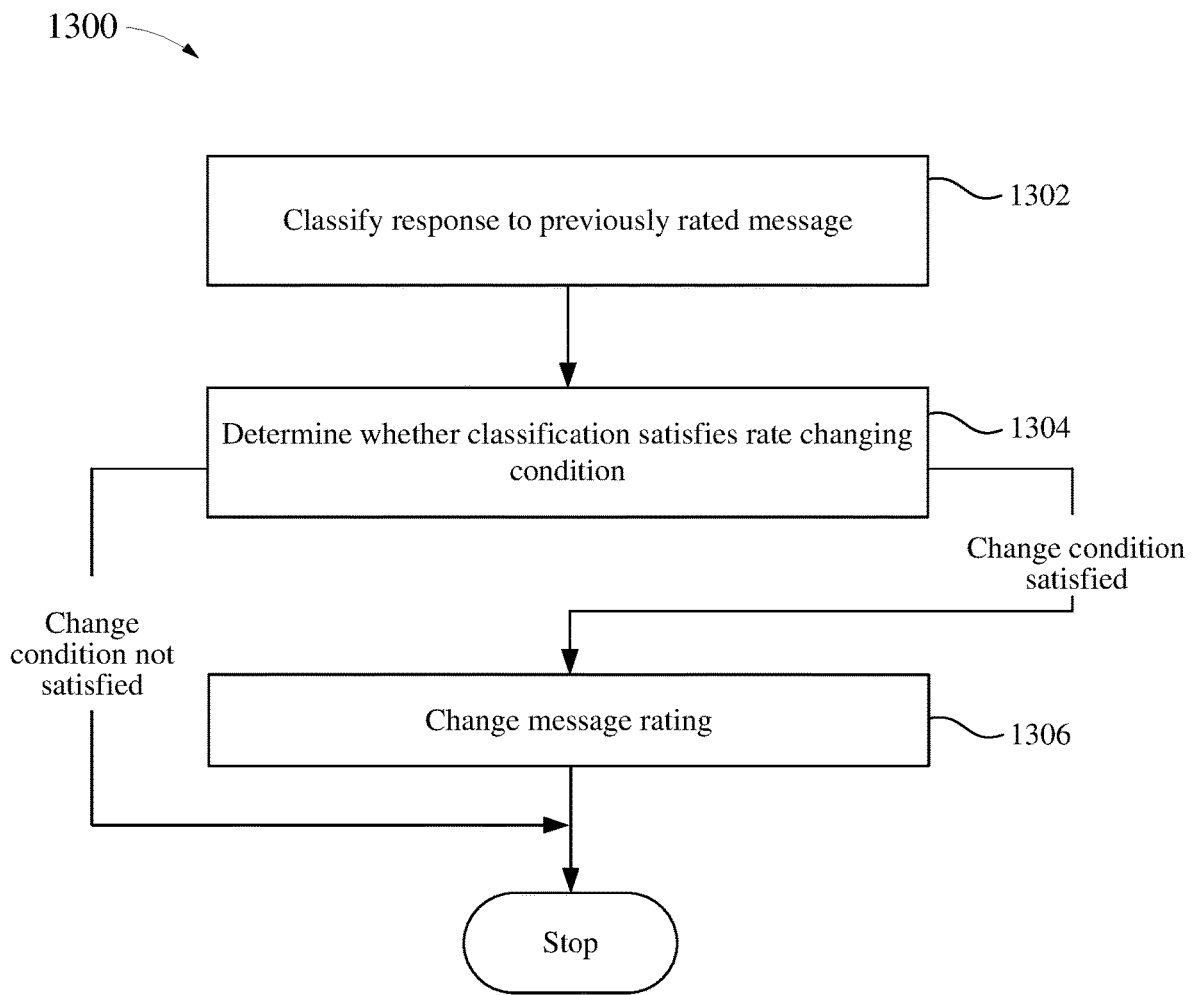
FIGS. 13A and 13B flowcharts of a method of messaging content evaluation system according to an embodiment of the present invention.
Figure 13B:
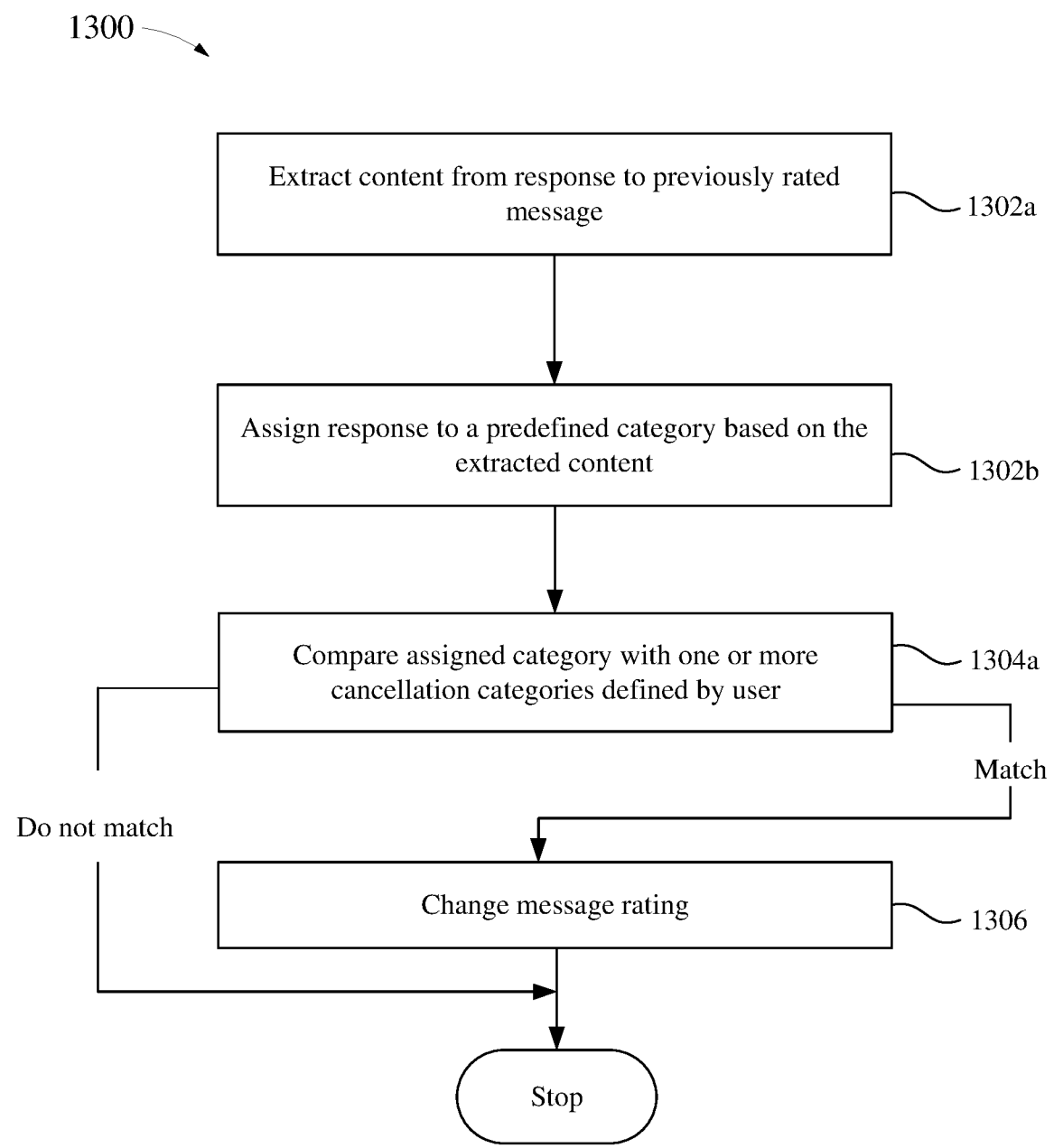

FIGS. 13A and 13B are flowcharts of a method 1300 of evaluating messaging content according to one embodiment. The method can be performed by a system the same or similar to the system described in connection with FIGS. 1-4. Method 1300 can begin with the receipt of a response to an earlier message that was previously rated by a system user. The response can be a comment on the message, a modification of content of the message by the message' originator, or any other follow-on message response to the message previously rated by the user. The message, the response, and the rating are conveyed over a communications network, such as a computer-based social network. Referring initially to FIG. 13A, the system classifies the response at 1302. At 1304, the system determines whether the classification satisfies a rate changing condition. If the condition is satisfied, then the system changes the rating in response at 1306. The rating can be changed by cancelling the rating or, depending on the specific network, by reversing the rating (e.g., changing a Like to a Dislike).

The flowchart of FIG. 13B depicts the classifying and determining in FIG. 13A, according to a particular embodiment. As illustrated for the particular embodiment, the response is classified by the system initially extracting content from the response at 1302a. Based on the extracted content, the system assigns the response to a predefined category 1302b. At 1304a, the system compares the assigned category to one or more cancellation categories defined by the user. The cancellation condition is satisfied if the categories match. If so, then the message rating is changed at 1306.

Other cancellation conditions can be specified. The system can monitor responses to previously rated messages and determine whether a particular cancellation condition is met. In response to the condition being met, the system can cancel (or reverse in some instances) a rating previously given by the user to the message.

In another embodiment, the user can specify a cancellation counter threshold. The cancellation counter is incremented each time a cancellation condition is satisfied, as for example, each time a response is assigned based on extracted content to a category that matches a predefined cancellation category. A previous rating is changed only if a user-specified value for the cancellation threshold is exceeded. In still another embodiment, the cancellation counter can be decremented with each response that does not satisfy the cancellation condition. A cancelled rating can be restored if the cancellation counter is decremented to a value less than the cancellation threshold value.

In yet another embodiment the user can designated another user a trusted party. The user can reserve a rating until a rating is made by the trusted party, at which time the reservation is cancelled, and if the trusted party's rating agrees, the formerly reserved rating can be made unconditional.

As already noted, the responses to messages (e.g., comments on or modifications of the content of a message) can be monitored on an on-going basis. If the context, meaning, or interpretation is likely to change due to a new comment yet to be submitted from a submitter, the system can determine based on various users' preferences (expressed by the users' respective classification data) the number of ratings that will be cancelled or reversed if the comment is submitted. If the number exceeds a predetermined threshold, the system can send an alert to the submitter indicating the specified number of ratings (e.g., Likes) that will be cancelled or reversed. The submitter can decide whether to publish the comment. In another embodiment, however, if the number of ratings that will change is greater than a predetermined threshold, the system optionally can prevent publication (e.g., preventing the comment being added to a series or related messages or on-going conversation over the social network). In one embodiment, users' classification data (and, accordingly, users' preferences) are known to a social network service and therefore the number of ratings that will be cancelled or reversed if the comment is submitted can be determined in advance of publication. In another embodiment, the response message is initially seen by the social networking service but not other users. Only after the system determines the number of ratings that will be cancelled or reversed is the response seen by other users, assuming that the sender chooses to send the response and that the system does not block the sending based on the determination of the number of rating cancellations or reversals.

FIGS. 14A-14F depict a method 1400 of content evaluation of messages conveyed over a computer network according to another embodiment. Method 1400 can be performed by a system the same or similar to the system described in connection with FIGS. 1-4. The method allows a user to rate messages with a conditional rating. A conditional rating is subject to automatic cancellation or reversal if the system, based on content analysis/classification, assigns a subsequent modification of the message or comment on the message to category that matches a cancellation category specified by the user or otherwise satisfies a predefined cancellation condition. A message modification or comment can be classified into multiple categories, for example, and the user can specify a threshold number of Dislike categories that the modification or comment must match in order for the system to cancel a previous rating of the original message. The system monitors changes to original message content, as well as subsequent comments to a message, and determines whether the cancellation condition is met (e.g., cancellation category matches exceed a threshold value). In response to the cancellation condition being met, an initial rating is changed, either by cancellation or reversal.

Method 1400 can begin in a wait mode at 1402 with the system waiting for a subsequent event (e.g., arrival of a message). The arrival of a message at 1404 prompts the system to determine whether the method is a new message or not. If new, the message is displayed at 1406 on devices communicatively lined to the computer network. If the message is not new, but modifies the content of an earlier message, the system at 1408 initiates the procedure illustrated in FIG. 14B.

The system analyzes the content of the message modification at 1410. The system determines whether the modification pertains to a message previously rated by a user. If conditional content rating (rating subject to cancellation or reversal) is present at 1412, the system determines at 1414 whether the assigned category based on extracted content matches categories indicating that the modification is, based on users' specifications, objectionable or conflictive. With each category match at 1414, a content rating counter is increased at 1416. Otherwise, the counter is decreased 1418 (if the counter was previously increased on the basis of previous analyses of the content). If, for each user considered by the system, the counter is greater than or equal to the user's cancellation threshold at 1420 and the number of rating cancellations is greater than or equal to the user's submission alert threshold at 1422, then an alert is sent to the content modifier at 1424. Otherwise, the system returns to wait mode 1402. At 1426 the modified content can still be submitted, notwithstanding the alert. If so, the submitted message is displayed at 1428, but if not, the system returns to wait mode at 1402. Content ratings are displayed, or not, at 1430 depending on the cancellation threshold value of each user and the count of each user's content rating counter.

Figure 14A:
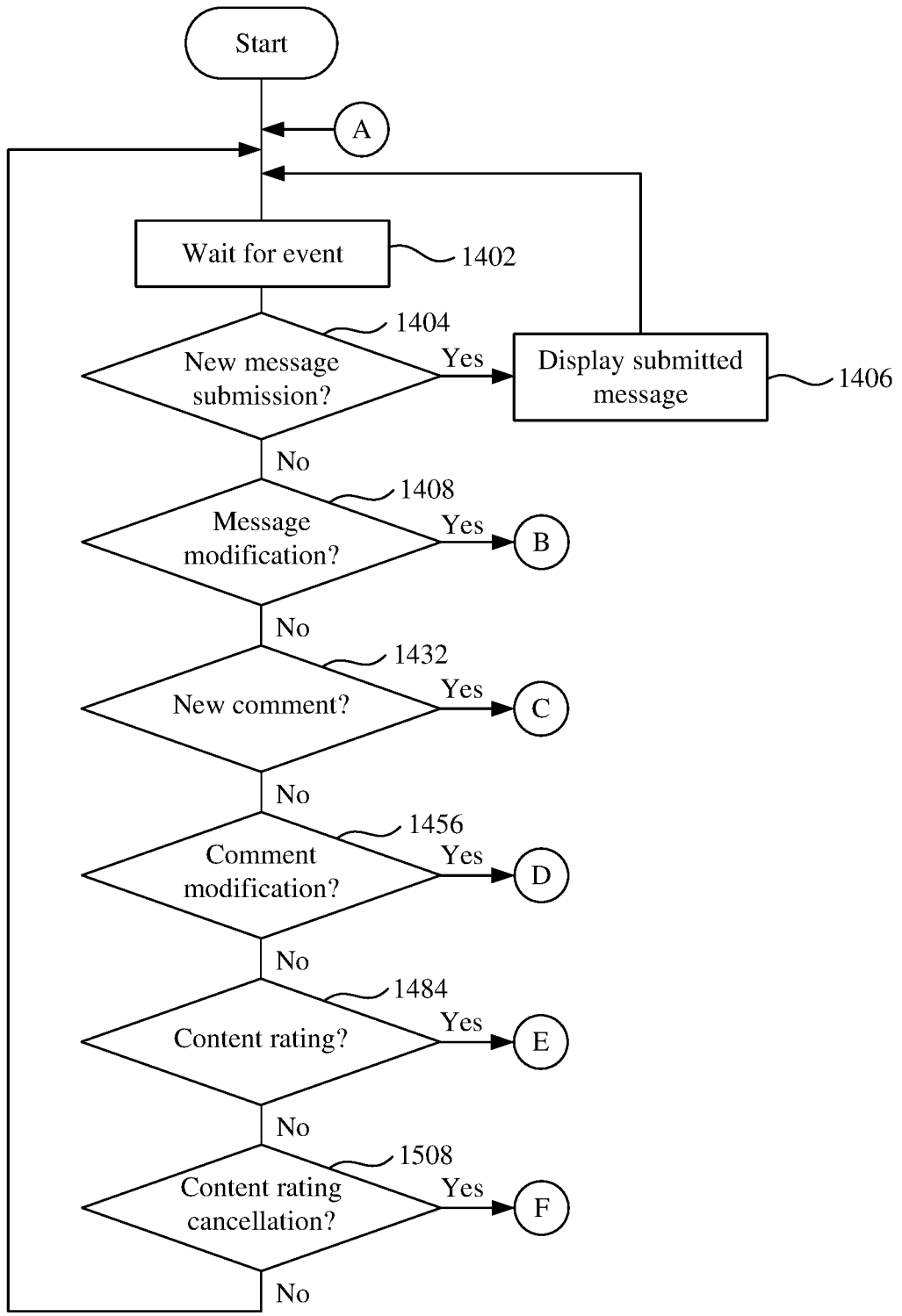
FIGS. 14A-14F are flowcharts of a method of messaging content evaluation system according to an embodiment of the present invention.
Figure 14B:
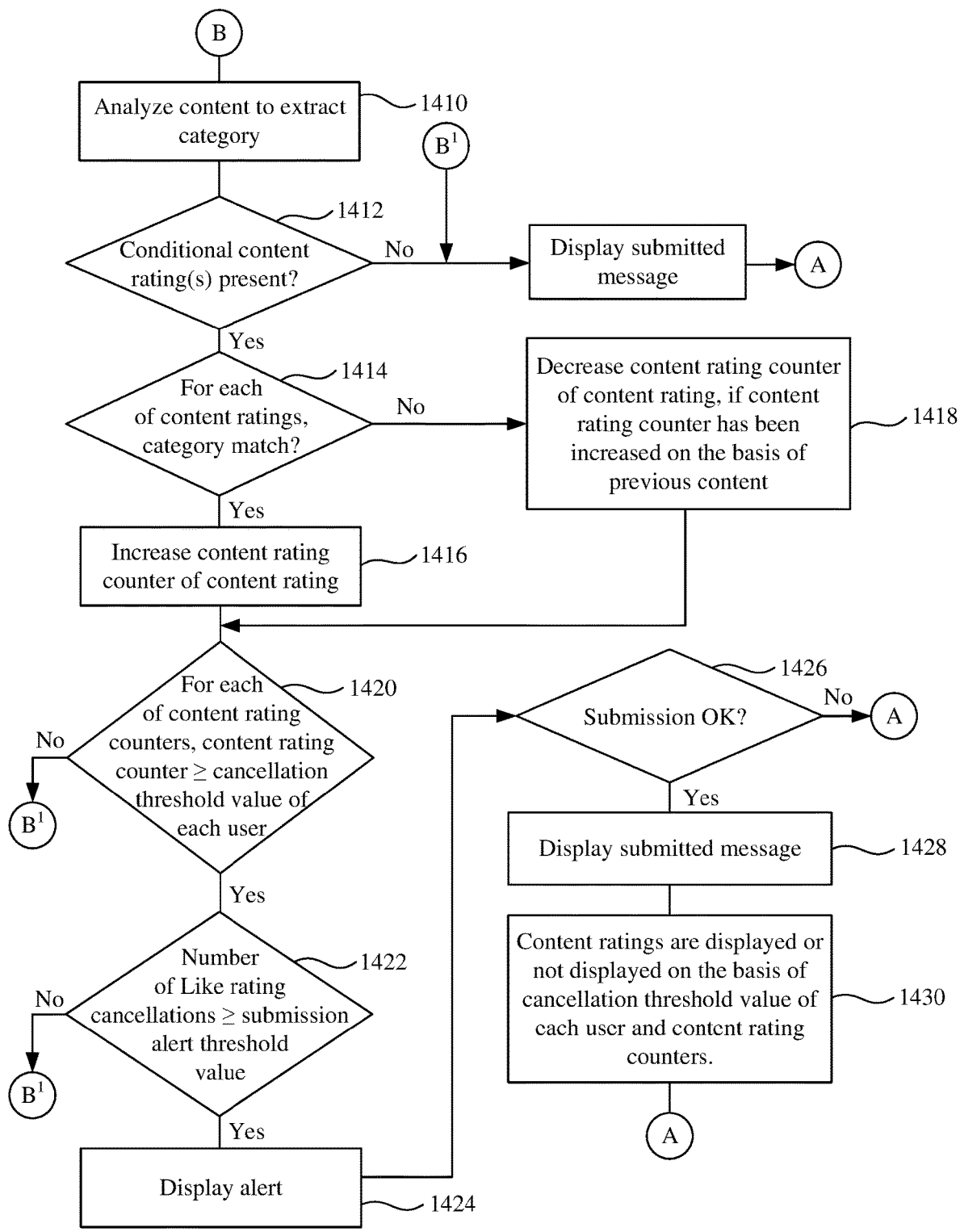
Figure 14C:
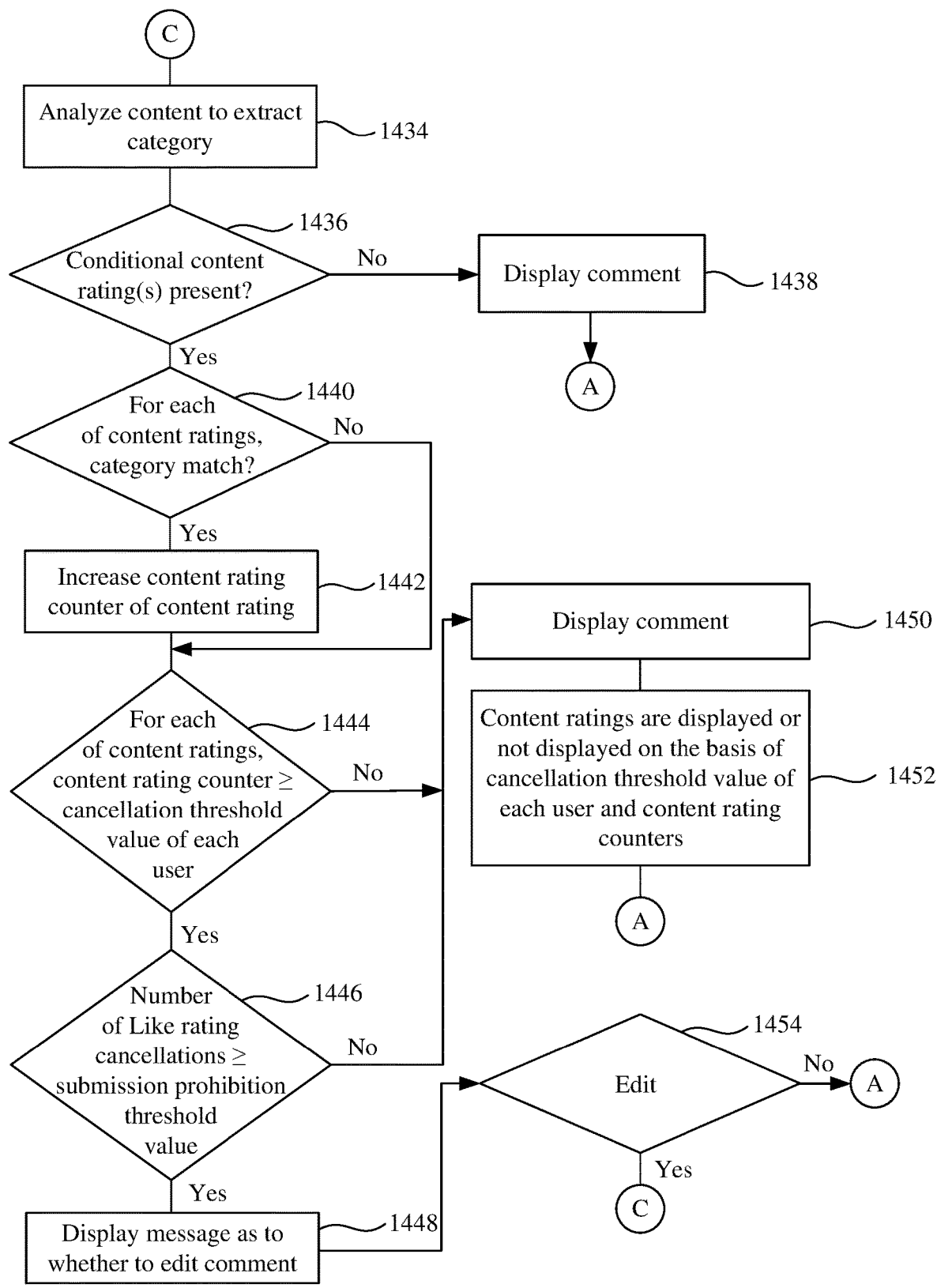

If a message is neither new nor a modification of an earlier message, but rather a comment, then at 1432, the system initiates the procedure illustrated in FIG. 14C. The system analyzes the comment's content at 1434 and determines whether one or more conditional ratings apply to the underlying message being commented on. If at 1436 no conditional ratings apply, then the comment is displayed at 1438 and the system returns to wait mode at 1402. Otherwise, the system determines at 1440 which if any categories, determined based on extracted content, assigned to the comment matches a category (Dislike category) indicating that the modification is objectionable or conflictive. If a category based on extracted content matches a user-specified Dislike category, a content rating counter is increased at 1442. If, for each user, the counter is greater than or equal to the user's cancellation threshold at 1444 and the number of rating cancellations is greater than or equal to the user's submission alert threshold at 1446, then the message is displayed for editing at 1448. Otherwise, the comment is displayed at

1450 and content ratings are displayed, or not, at 1452 depending on the cancellation threshold value of each user and the count of each user's respective content rating counter, after which the system returns to wait mode 1402. If the comment is edited, then at 1454 the system repeats the procedure beginning anew at 1434. Otherwise, if the content is not edited, the system returns to wait mode at 1402 without the comment having been displayed.

Figure 14D:
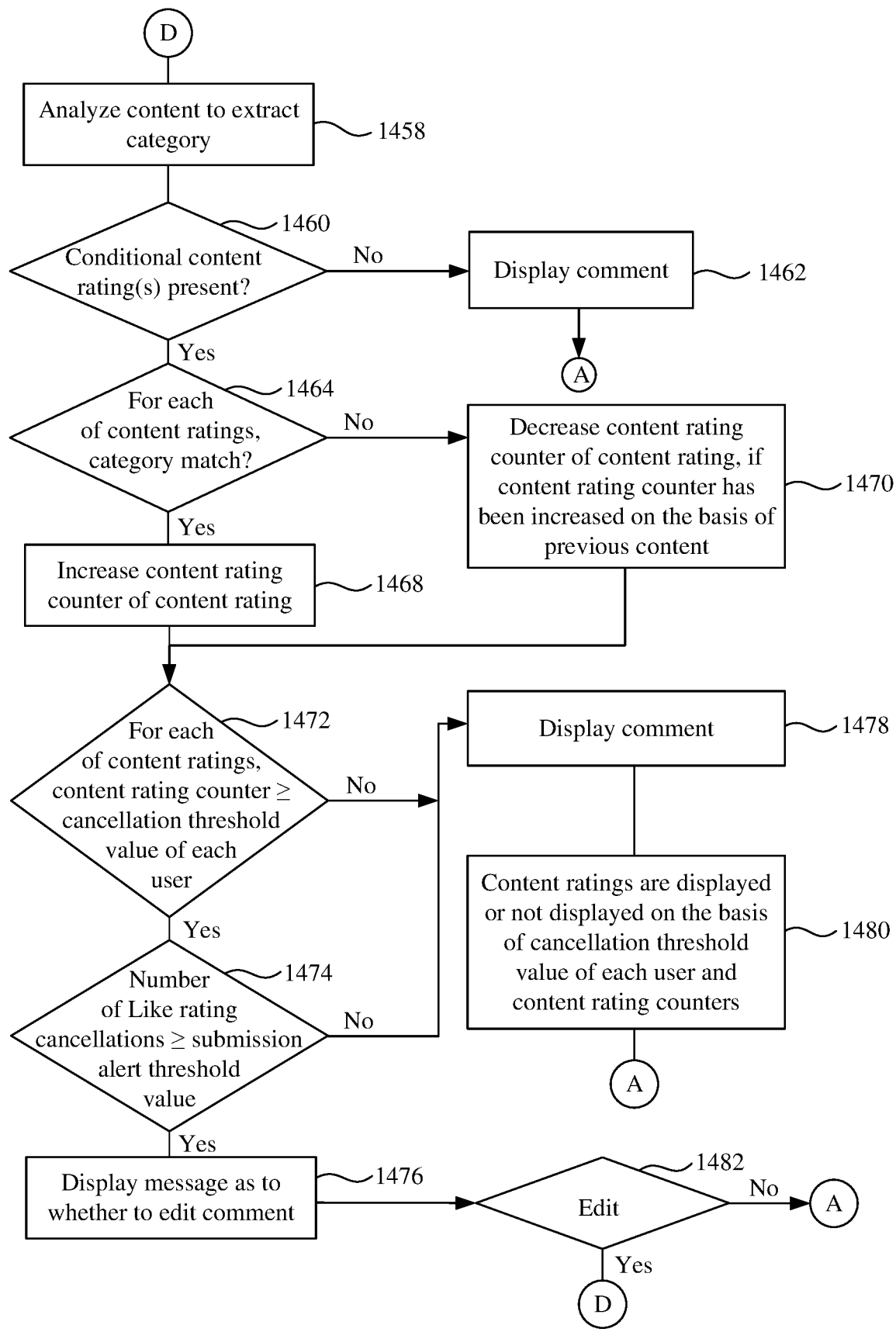

If a comment modification is presented at 1456, the system initiates the procedure depicted in FIG. 14D. The procedure is essentially the same as the procedure illustrated in FIG. 14C. The system analyzes the content at 1458. If at 1460 conditional content ratings (ratings subject to cancellation or reversal) are not present with respect to underlying message rated by a user, then the comment is displayed at 1462 and the system returns to wait mode at 1402. Otherwise, the system determines at 1464 whether each the category assigned on the basis of extracted content matches a category indicating that the modification is, based on users' specifications, objectionable or conflictive (matches a Dislike category). If a content category matches a Dislike category, a content rating counter is increased at 1468. Otherwise, at 1470, the counter is decreased if the counter was previously increased on the basis of previous analyses of content. If, for each user, the counter is greater than or equal to the user's cancellation threshold at 1472 and the number of rating cancellations is greater than or equal to the user's submission alert threshold at 1474, then the message is displayed for editing at 1476. Otherwise, the comment is displayed at 1478 and content ratings are displayed, or not at 1480 depending on the cancellation threshold value of each user and the count of each user's respective content rating counter, after which the system returns to wait mode 1402. If the comment is edited, then at 1482, the system repeats the procedure, beginning anew at 1458. Otherwise, if the content is not edited, the system returns to wait mode at 1402.

Figure 14E:
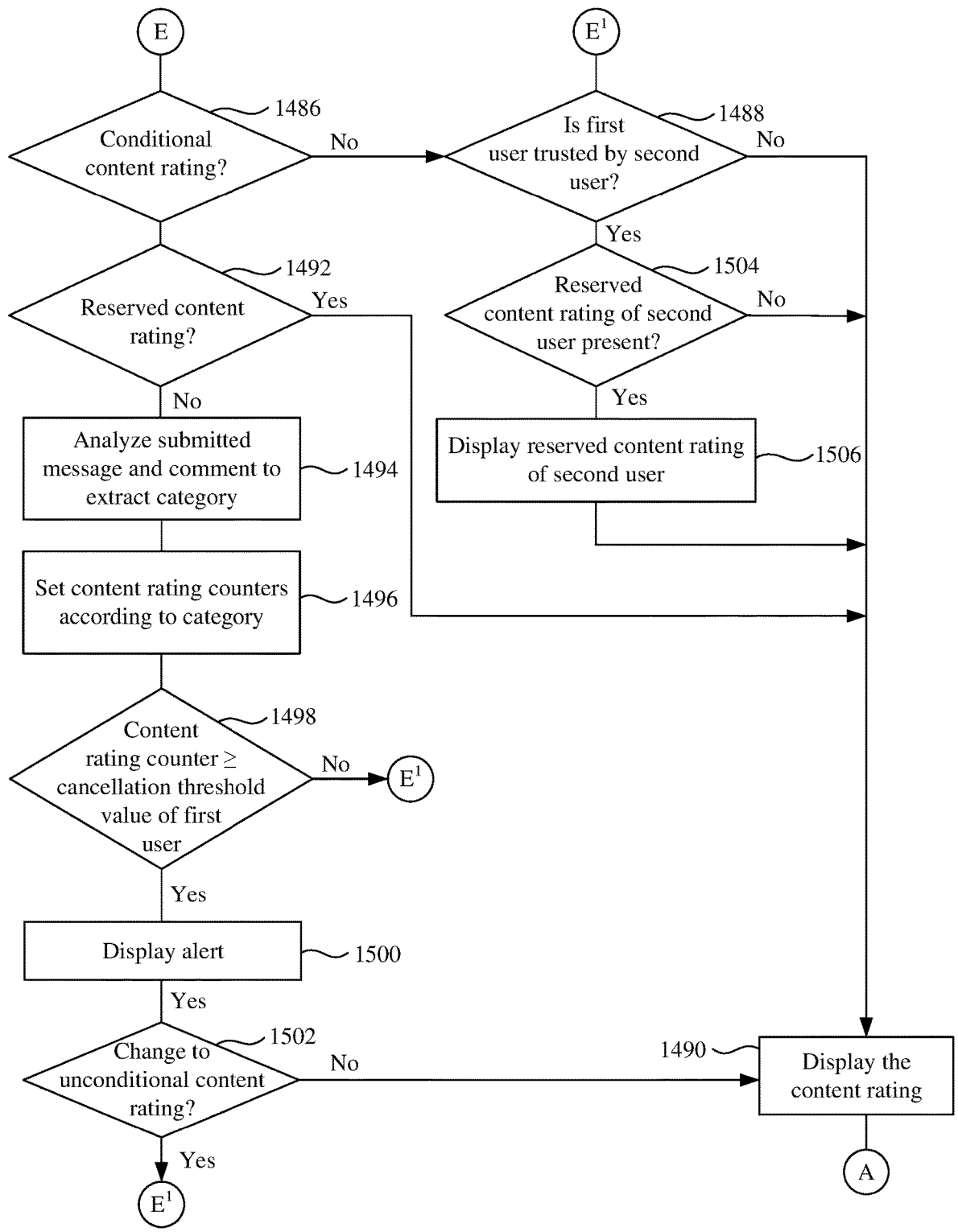
Figure 14F:
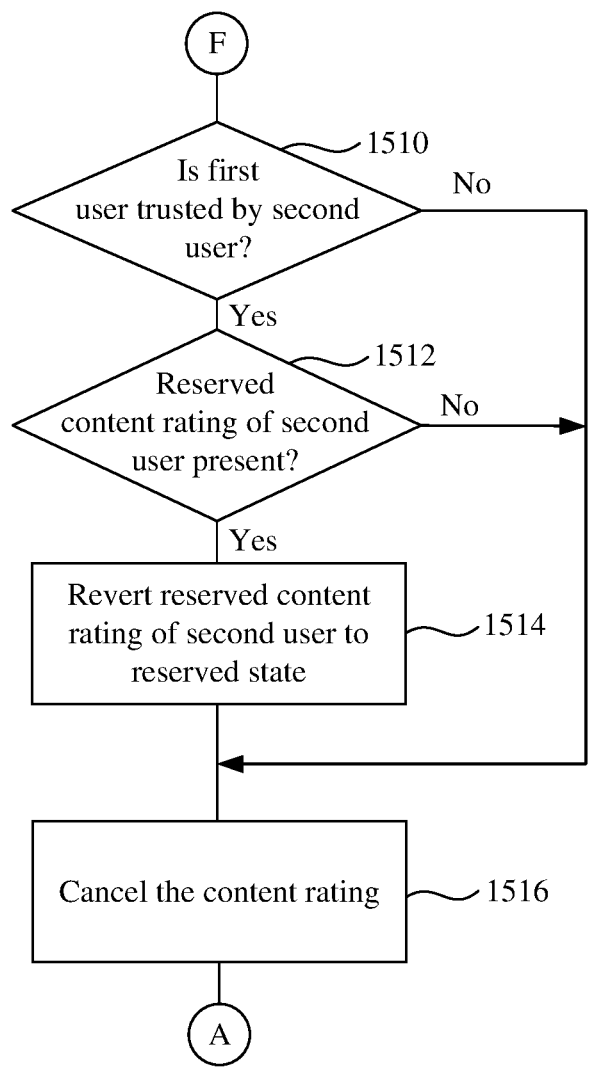

The procedure illustrated in FIG. 14E applies if the event at 1484 is a content rating. Initially, if at 1486 the rating is not a conditional rating (e.g., one subject to cancellation or reversal) and at 1488 the user is not a trusted user, then content rating is displayed at 1490, after which the system returns to wait mode 1402. If at 1486 the rating is a conditional rating, and a reserved rating (e.g., reserved until a trusted party provides an identical rating), then the reserved content rating is displayed at 1490, after which the system returns to wait mode 1402. If at 1492, however, the conditional rating (e.g., one subject to cancellation) is a not reserved rating, then at 1494 the system analyzes the message submitted and the comment on the message. At 1496, the system sets rating counters according to the category. If at 1498, the content rating counter is greater than or equal to the cancellation threshold of the first user, then an alert is sent at 1500. If the conditional rating is not changed to unconditional (no longer subject to change or cancellation) at 1502, then the system returns to wait mode at 1402. If, however, the content rating counter is less than the cancellation threshold of a first user or the content rating is changed to unconditional, then the system determines whether the first user is trusted by the second user at 1488. If not, the system displays the content rating. If the first user is trusted by the second user at 1488 and a reserved content rating of the second user is present at 1504, then the reserved rating is displayed, the reserved rating of the second user having been confirmed by the trusted first user. If the reserved content rating of the second user is present, then the reserved content rating of the second user is displayed, after which the system returns to wait mode at 1402.

The procedure depicted in FIG. 14 F applies when at 1508 a content rating cancellation occurs. The system cancels the content rating if the first user is not trusted by the second user at 1510 or a reserved content rating of the second user is not present at 1512. If the first user is trusted by the second user at 1510 and a reserved content rating of the second user is present at 1512, then the reserved content rating reverts to a reserved (unused state) at 1514 and the reserved content rating is cancelled at 1516. In any event, after cancellation system returns to wait mode at 1402.

The methods described can be implemented in a computer program product. The computer program product can include a computer readable storage medium (or media) having computer readable program instructions thereon for causing a processor to carry out the operations as described in the content of the methods illustrated in the figures.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments disclosed herein have been presented for purposes of illustration and are not intended to be exhaustive or limiting. Many modifications and variations will be apparent to those of ordinary skill in the art without departing from the scope and spirit of the described embodiments. The terminology used herein was chosen to best explain the principles of the embodiments, the practical application or technical improvement over the technologies found in the marketplace, or to enable others of ordinary skill in the art to understand the embodiments disclosed herein.

That which is claimed is:

1. A method, comprising:
    classifying, using computer hardware, a response to a message previously rated by a user, wherein the message, the response to the message, and rating by the user are provided on a communications network;
    automatically changing, with the computer hardware, the rating of the message when the classifying results in a classification that satisfies a predefined rating change condition;
    analyzing a comment on the rated message and sending via the communication network a notification to a third-party notifying the third-party that adding the comment to a message stream including the rated message will cancel at least one prior rating of the message; and
    determining a number of messages that adding the comment will cancel and preventing adding the comment in response to determining that the number exceeds a predetermined threshold.

2. The method of claim 1, wherein the response comprises a modification of content of the message, and wherein the changing comprises at least one action selected from a group consisting of cancelling the rating provided by the user and reversing the rating provided by the user.

3. The method of claim 1, wherein the classifying comprises extracting content from the response and assigning extracted content to a predefined category, and wherein the change condition is satisfied when the category matches a user-specified change category.

4. The method of claim 1, further comprising providing the rating by the user in response to the rating being provided by a third-party designated by the user as a trusted party.

5. The method of claim 4, wherein the rating provided by the user is based on an earlier-provided reserved rating provided by the user.

6. A system, comprising:
    at least one processor programmed to initiate executable operations, the executable operations including:
        classifying a response to a message previously rated by a user, wherein the message, the response to the message, and rating by the user are provided on a communications network;
        automatically changing the rating of the message when the classifying results in a classification that satisfies a predefined rating change condition;
        analyzing a comment on the rated message and sending via the communication network a notification to a third-party notifying the third-party that adding the comment to a message stream including the rated message will cancel at least one prior rating of the message; and determining a number of messages that adding the comment will cancel and preventing adding the comment in response to determining that the number exceeds a predetermined threshold.

7. The system of claim 6, wherein the response comprises a modification of content of the message, and wherein the changing comprises at least one action selected from a group consisting of cancelling the rating provided by the user and reversing the rating provided by the user.

8. The system of claim 6, wherein the classifying comprises extracting content from the response and assigning extracted content to a predefined category, and wherein the change condition is satisfied when the category matches a user-specified change category.

9. The system of claim 6, further comprising providing the rating by the user in response to the rating being provided by a third-party designated by the user as a trusted party.

10. The system of claim 9, wherein the rating provided by the user is based on an earlier-provided reserved rating provided by the user.

11. A computer program product, comprising:
a computer-readable storage medium having program code stored thereon, the program code executable by computer hardware to initiate operations including:
classifying a response to a message previously rated by a user, wherein the message, the response to the message, and rating by the user are provided on a communications network;
automatically changing the rating of the message when the classifying results in a classification that satisfies a predefined rating change condition;
analyzing a comment on the rated message and sending via the communication network a notification to a third-party notifying the third-party that adding the comment to a message stream including the rated message will cancel at least one prior rating of the message; and
determining a number of messages that adding the comment will cancel and preventing adding the comment in response to determining that the number exceeds a predetermined threshold.

12. The computer program product of claim 11, wherein the response comprises a modification of content of the message, and wherein the changing comprises at least one action selected from a group consisting of cancelling the rating provided by the user and reversing the rating provided by the user.

13. The computer program product of claim 11, wherein the classifying comprises extracting content from the response and assigning extracted content to a predefined category, and wherein the change condition is satisfied when the category matches a user-specified change category.

14. The computer program product of claim 11, further comprising providing the rating by the user in response to the rating being provided by a third-party designated by the user as a trusted party.

15. The computer program product of claim 14, wherein the rating provided by the user is based on an earlier-provided reserved rating provided by the user.

\* \* \* \* \*